May 15, 1934.  E. D. BETTS  1,958,738

WATER HEATING COIL

Filed Oct. 26, 1933

INVENTOR
Everett D. Betts
BY Chappell & Earl
ATTORNEYS

Patented May 15, 1934

1,958,738

UNITED STATES PATENT OFFICE 1,958,738

WATER HEATING COIL

Everett D. Betts, Dowagiac, Mich., assignor to Rudy Furnace Company, Dowagiac, Mich.

Application October 26, 1933, Serial No. 695,234

5 Claims. (Cl. 257—248)

The main objects of this invention are:

First, to provide a water heating coil for furnaces which does not obstruct the firepot or the combustion chamber and which is highly efficient.

Second, to provide a water heating coil formed as an integral unit which is economical to produce any may be very easily installed.

Objects relating to details and economies of my invention will appear from the description to follow. The invention is defined and pointed out in the claims.

A structure which is a preferred embodiment of my invention is illustrated in the accompanying drawing, in which.

Figure 1:
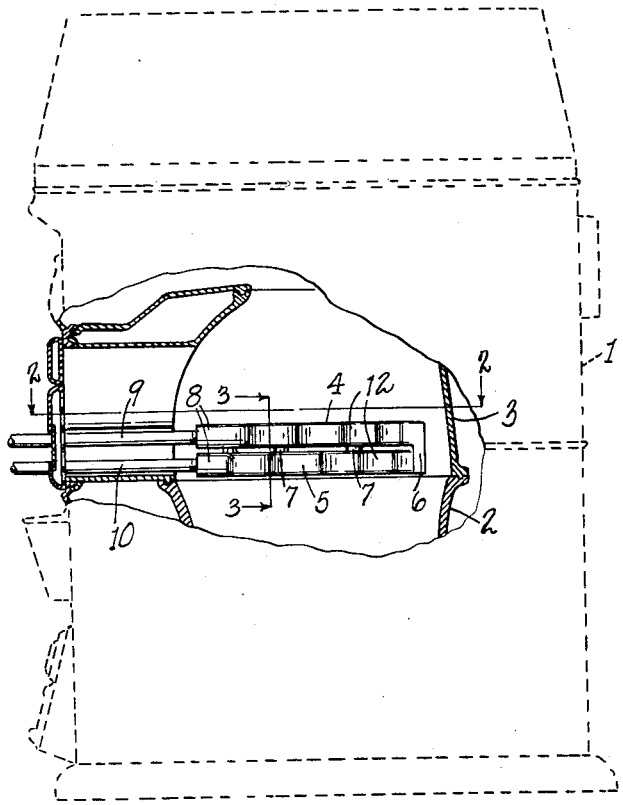
Fig. 1 is a side elevation of a furnace having a heating coil embodying the features of my invention, the furnace casing being shown by dotted lines, a portion thereof being broken away, portions of the furnace body being shown in vertical section on a line corresponding to line 1—1 of Fig. 2.
Figure 2:
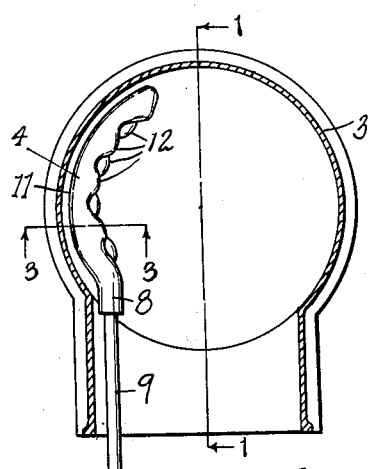
Fig. 2 is a horizontal section through the furnace body on a line corresponding to line 2—2 of Fig. 1.
Figure 3:
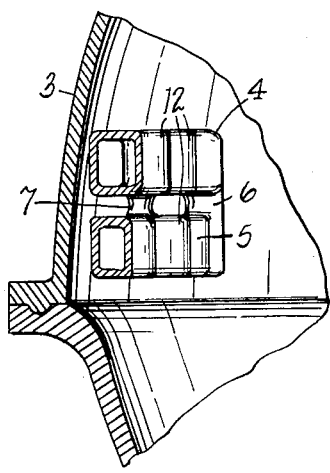
Fig. 3 is an enlarged fragmentary vertical section on a line corresponding to line 3—3 of Figs. 1 and 2.
Figure 4:
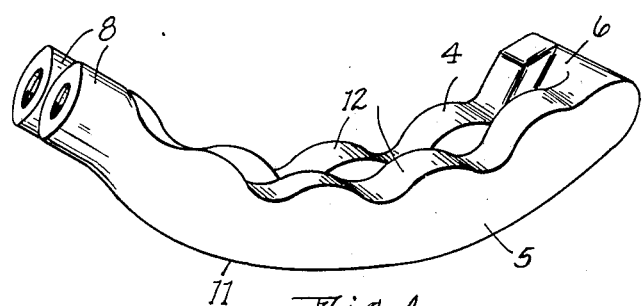
Fig. 4 is an inside perspective view of the water heating coil.

In the embodiment of my invention illustrated, 1 indicates the furnace casing, 2 the firepot of the furnace and 3 the combustion chamber. My improved water coil is shown in Figs. 1, 2 and 3 of the drawing in operative or installed position.

My improved water coil comprises an integral casting consisting of an upper flue 4, and a lower flue 5 connected at their inner ends by an integral conduit or passage 6. The top and bottom walls of these flues are flat and they are connected at spaced intervals by the posts 7. The flues terminate at their outer ends in parallel portions 8 internally threaded to receive the inlet and outlet pipes 9 and 10 respectively.

The coil is in the form of an arc of a circle, the curvature being in conformity with the shape or curve of the combustion chamber 3, the outer walls 11 of the flues being substantially segments of a cylinder.

In installing, the outer walls are disposed adjacent to but somewhat spaced from the wall of the combustion chamber to permit the circulation of gases or the heated products of combustion between the wall of the combustion chamber and the coil. The top and bottom walls of the flues are, as stated, flat and they are uniformly spaced so that the products of combustion may pass between them.

The inner walls of the flues are provided with corrugation-like flutes 12, the flutes of one flue being disposed in staggered relation relative to the flutes of the other. These corrugations or flutes not only serve to increase the heating or heat absorbing area of the coil but also serve to set up currents of the gases or products of combustion between the flues, thereby increasing their efficiency.

My improved coil presents approximately twenty-five percent more heating surface to the fire than the conventional type of coil or coils commonly used in furnaces. The capacity of the coil is also approximately twenty-five percent greater than that of conventional coils. Thus the efficiency of my coil is materially greater than that of ordinary coil construction. The greater capacity reduces the tendency to boil water, which in turn reduces liming. With reduced liming, the life of the heating coil is increased. The arcuate shape of my heating coil allows full use of the firepot and does not hold coal away from the side thereof.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent, is:

1. A water heating coil for furnaces comprising an integral unit consisting of vertically spaced segmental flues having flat parallel top and bottom walls and connected at their inner ends by an integral conduit and having integral spaced posts intermediate their ends, the flues terminating at their outer ends in parallel portions internally threaded to receive connecting pipes, the inner walls of the flues having vertical flutes disposed in staggered relation, the outer walls being flat and of approximately uniform curvature.

2. A water heating coil for furnaces comprising an integral unit consisting of vertically spaced segmental flues having flat parallel top and bottom walls and connected at their inner ends by an integral conduit and having integral spaced posts intermediate their ends, the flues terminating at their outer ends in parallel portions internally threaded to receive connecting pipes, the inner walls of the flues having vertical flutes, the outer walls being flat and of approximately uniform curvature.

3. A water heating coil for furnaces comprising an integral unit consisting of vertically spaced segmental flues connected at their inner ends, the flues terminating at their outer ends in parallel portions internally threaded to receive connecting pipes, the inner walls of the flues having vertical flutes disposed in staggered relation.

4. A water heating coil for furnaces comprising an integral unit consisting of vertically spaced segmental flues connected at their inner ends and having an inlet and an outlet at their outer ends, the inner walls of the flues having vertical flutes disposed in staggered relation.

5. A furnace heating coil comprising a plurality of series-connected sections arranged in spaced parallel relation and curved to conform to the wall of the furnace, the inner walls of the sections having transverse waves or flutes.

EVERETT D. BETTS.